US010066541B2

(12) United States Patent
Li et al.

(10) Patent No.: US 10,066,541 B2
(45) Date of Patent: Sep. 4, 2018

(54) PHYSICS-BASED VEHICLE TURBOCHARGER CONTROL TECHNIQUES

(71) Applicants: Yang Li, Northville, MI (US); Songping Yu, Troy, MI (US)

(72) Inventors: Yang Li, Northville, MI (US); Songping Yu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 148 days.

(21) Appl. No.: 15/142,578

(22) Filed: Apr. 29, 2016

(65) Prior Publication Data

US 2017/0314459 A1 Nov. 2, 2017

(51) Int. Cl.
*F02D 23/00* (2006.01)
*F02B 33/44* (2006.01)
*F02B 37/18* (2006.01)
*F02D 11/10* (2006.01)
*F02D 9/02* (2006.01)
*F02B 37/02* (2006.01)
*F02M 35/10* (2006.01)
(Continued)

(52) U.S. Cl.
CPC ............ *F02B 37/186* (2013.01); *F01N 3/101* (2013.01); *F02B 37/025* (2013.01); *F02D 9/02* (2013.01); *F02D 11/105* (2013.01); *F02D 41/1401* (2013.01); *F02M 35/1038* (2013.01); *F02M 35/10157* (2013.01); *F02D 2009/0228* (2013.01); *F02D 2041/1409* (2013.01)

(58) Field of Classification Search
CPC .... F02B 37/186; F02B 37/118; F02B 37/183; F02B 37/025; F02D 9/02; F02D 11/105; F02D 41/1401; F02D 2009/0228; F02D 41/0007; F02D 2041/1409; F02M 35/10157; F02M 35/1038; F01N 3/101

USPC ............... 60/602, 605.1, 611, 607–608; 701/101–104
See application file for complete search history.

(56) References Cited

U.S. PATENT DOCUMENTS 5,845,627 A 12/1998 Olin et al.
6,167,342 A 12/2000 Itoyama et al.
(Continued)

FOREIGN PATENT DOCUMENTS

CN 105201639 A 12/2015
GB 2502805 A * 12/2013 ............. F02D 23/00

OTHER PUBLICATIONS

International Search Report and Written Opinion dated May 24, 2017 for International Application No. PCT/US2017/020863, International Filing Date Mar. 6, 2017.

*Primary Examiner* — Thai Ba Trieu
(74) *Attorney, Agent, or Firm* — Ralph E. Smith

(57) ABSTRACT

Control techniques for a turbocharger of an engine utilize a wastegate valve configured to divert exhaust gas from a turbine of the turbocharger that is rotatably coupled to a compressor of the turbocharger. A controller is utilized to obtain a torque request for the engine, determine a target compressor power based on the engine torque request, determine a normalized target turbine power based on the target compressor power, determine a target position for the wastegate valve based on the normalized target turbine power and a normalized exhaust flow, and actuate the wastegate valve to the target position. Such control techniques involve the actual calculation of much less intermediate parameters, such as target turbine pressure ratio, which results in more efficient calibration and implementation.

20 Claims, 4 Drawing Sheets

(51) Int. Cl.
*F02D 41/14* (2006.01)
*F01N 3/10* (2006.01)

(56) References Cited

U.S. PATENT DOCUMENTS

| | | | |
|---|---|---|---|
| 7,478,533 B2* | 1/2009 | Ueno | F02D 41/0007 60/608 |
| 7,565,236 B2 | 7/2009 | Turin et al. | |
| 7,770,393 B2* | 8/2010 | Buckland | F02D 41/0007 60/602 |
| 7,788,922 B2 | 9/2010 | Muller | |
| 7,805,939 B2* | 10/2010 | Kimoto | F02D 41/0007 60/612 |
| 7,827,790 B2* | 11/2010 | Kimoto | F02D 41/0007 60/608 |
| 7,987,040 B2* | 7/2011 | Buckland | F02D 41/0007 701/103 |
| 8,195,311 B2 | 6/2012 | Karpman et al. | |
| 8,359,858 B2* | 1/2013 | Pursifull | F02D 41/0007 60/612 |
| 8,428,835 B2 | 4/2013 | Habert et al. | |
| 2006/0196182 A1 | 9/2006 | Kimoto et al. | |
| 2006/0207252 A1* | 9/2006 | Isobe | F02D 41/0007 60/601 |
| 2008/0282698 A1 | 11/2008 | Ferrari et al. | |
| 2009/0019848 A1 | 1/2009 | Ballauf et al. | |
| 2009/0090106 A1 | 4/2009 | Muller | |
| 2011/0041493 A1 | 2/2011 | Doering et al. | |
| 2011/0264353 A1 | 10/2011 | Atkinson et al. | |
| 2013/0211693 A1* | 8/2013 | Petrovic | F02D 41/0007 701/104 |
| 2013/0282256 A1* | 10/2013 | Watanuki | F02B 37/18 701/102 |
| 2014/0345255 A1* | 11/2014 | Zhu | F02D 41/1401 123/564 |
| 2015/0082788 A1 | 3/2015 | Wang et al. | |
| 2015/0101581 A1 | 4/2015 | Karacic et al. | |
| 2015/0204257 A1* | 7/2015 | Osumi | F02B 37/183 60/601 |
| 2016/0146130 A1* | 5/2016 | Haskara | F02D 41/0007 60/605.2 |
| 2016/0363043 A1* | 12/2016 | Hirayama | F02D 41/0007 |
| 2017/0030259 A1* | 2/2017 | Tabata | F02B 37/18 |
| 2017/0044971 A1* | 2/2017 | Racca | F02D 41/0007 |
| 2017/0145907 A1* | 5/2017 | Nishio | F02D 41/1401 |

* cited by examiner

PHYSICS-BASED VEHICLE TURBOCHARGER CONTROL TECHNIQUES

FIELD

The present application generally relates to turbocharged vehicles and, more particularly, to physics-based turbocharger control techniques.

BACKGROUND

A turbocharger is a turbine-driven forced-induction device that increases airflow in an internal combustion engine. A compressor, which is driven by turbine, draws in ambient air and compresses it before it enters the engine at an increased pressure. This results in a greater mass of air entering cylinders of the engine on each intake stroke, which increases the engine's efficiency through decreased throttling losses and increases the engine's power output. Kinetic energy of exhaust gas produced by combustion of the air and fuel within the cylinders is then utilized to drive the turbine of the turbocharger.

Conventional control of vehicle turbocharger systems is often inefficient. One potential source of this inefficiency is the large number of interconnected components (compressor, turbine, throttle valve, wastegate valve, etc.) and their varying fluid effects. These conventional turbocharger control techniques involve complex modeling and computation, which is difficult and sometimes infeasible for implementation by an engine control unit (ECU). Accordingly, while such turbocharger control systems work for their intended purpose, there remains a need for improvement in the relevant art

SUMMARY

According to a first aspect of the invention, a control system for a turbocharger of an engine is presented. In one exemplary implementation, the system includes a wastegate valve configured to divert exhaust gas from a turbine of the turbocharger, the turbine being rotatably coupled to a compressor of the turbocharger, and a controller configured to: obtain a torque request for the engine; determine a target compressor power based on the engine torque request; determine a normalized target turbine power based on the target compressor power; determine a target position for the wastegate valve based on the normalized target turbine power and a normalized exhaust flow; and actuate the wastegate valve to the target position. The actuation of the wastegate valve by the controller (i) decreases at least one of boost reservation and throttling losses to (ii) increase at least one of engine response, performance, and fuel economy.

According to a second aspect of the invention, a method for controlling a turbocharger of an engine is presented. In one exemplary implementation, the method includes obtaining, by a controller, a torque request for the engine; determining, by the controller, a target compressor power based on the engine torque request; determining, by the controller, a normalized target turbine power based on the target compressor power; determining, by the controller, a target position for the wastegate valve based on the normalized target turbine power and a normalized exhaust flow; and actuating, by the controller, a wastegate valve to the target position, the wastegate valve being configured to divert exhaust gas from the turbine. The actuating of the wastegate valve by the controller (i) decreases at least one of boost reservation and throttling losses to (ii) increase at least one of engine response, performance, and fuel economy.

In some implementations, the controller is further configured to: based on the engine torque request, determine a target engine airflow and a target pressure at an inlet of a throttle downstream from the compressor; and determine the target compressor power based on specific heat coefficients, air temperature and pressure at an inlet of the compressor, and an efficiency of the compressor. In some implementations, the controller is configured to determine the normalized target turbine power based further on a specific heat coefficient, exhaust pressure at an outlet of the turbine, and exhaust temperature at an inlet of the turbine.

In some implementations, a barometric pressure sensor is configured to measure a barometric pressure, and the controller is further configured to: determine the air pressure at the compressor inlet as a difference between the barometric pressure and a pressure drop across an air filter upstream from the compressor; and determine the exhaust pressure at the outlet of the turbine as a sum of the barometric pressure and a pressure drop across an exhaust treatment system downstream from the wastegate valve. In some implementations, the turbine is a twin scroll turbine disposed upstream from the exhaust treatment system, and wherein the exhaust treatment system comprises a three-way catalytic converter and a muffler.

In some implementations, the controller is further configured to: determine a closed-loop correction value for the target position for the wastegate valve based on an error between the target throttle inlet pressure and an actual throttle inlet pressure; and actuate the wastegate valve to a corrected target position that is based on the target position and the closed-loop correction value. In some implementations, a compressor inlet temperature sensor is configured to measure the air temperature at the compressor inlet, a throttle inlet pressure sensor is configured to measure the actual throttle inlet pressure, and the controller is further configured to determine the turbine inlet exhaust temperature based on engine speed and engine load.

In some implementations, the controller is configured to implement a proportional-integral-derivative (PID) control scheme to determine the closed-loop correction value. In some implementations, a wastegate valve actuator comprises an electric direct current to direct current (DC-DC) motor configured to actuate the wastegate valve, a wastegate valve position sensor configured to measure a position of the wastegate valve actuator, and the controller is further configured to determine a position of the wastegate valve based on the position of the DC-DC electric motor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, conventional turbocharger control is often inefficient and there remains a need for improvement in the relevant art. Accordingly, improved physics-based turbocharger control techniques are presented. These techniques directly link a target compression power to a position of the wastegate valve. This modeling eliminates many complex intermediate mathematical operations and dramatically simplifies the calibration process. One benefit of the disclosed techniques is decreased costs due to ease of implementation by the ECU and much less calibration effort. More specifically, the disclosed techniques involve the calculation of much fewer parameters compared to conventional model-based techniques. Another benefit of the disclosed techniques is improved response, performance, and/or fuel economy from decreased boost reservation and/or throttling losses as a result of the improved robustness of during transient operation and for varying environmental conditions.

Figure 1:
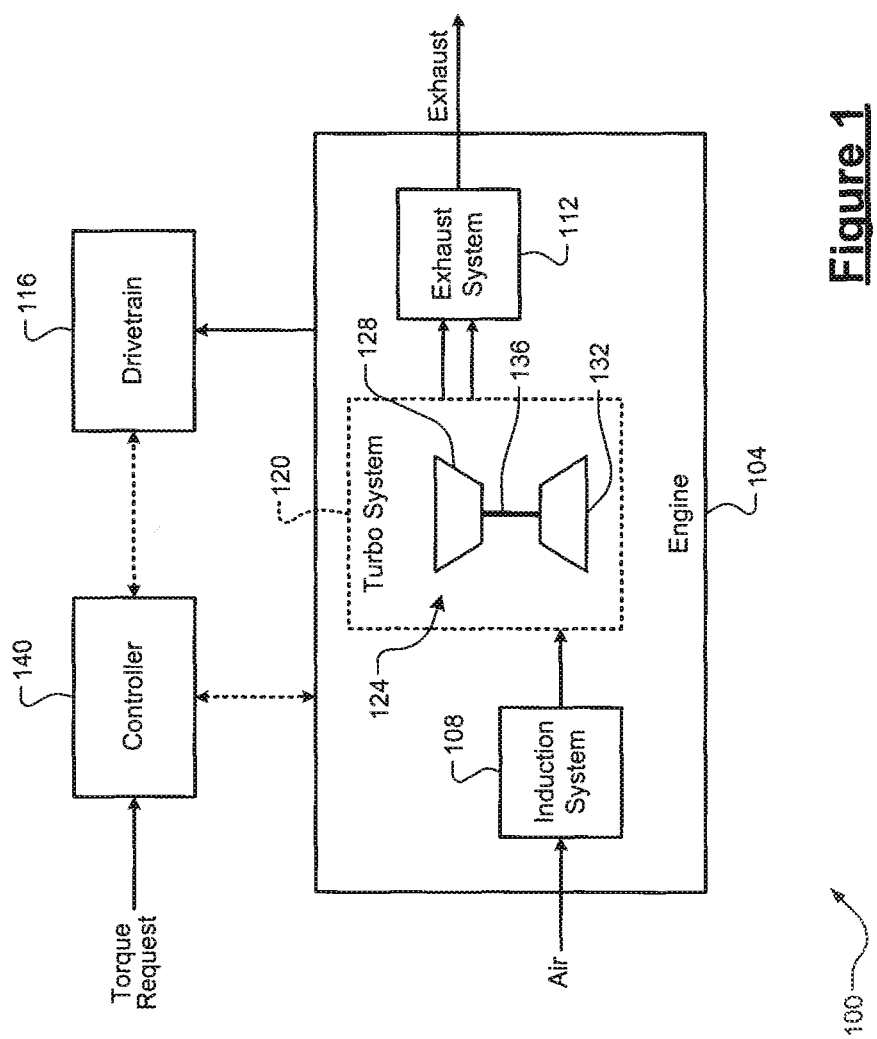
FIG. 1 is a functional block diagram of an example vehicle according to the principles of the present disclosure.

Referring now to FIG. 1, a functional block diagram of an example vehicle 100 is illustrated. The vehicle 100 includes an internal combustion engine 104 that combusts an air/fuel mixture to generate drive torque. Non-limiting examples of the engine 104 include spark ignition (SI) engines and compression ignition (CI) engines. While not illustrated or discussed herein, it will be appreciate that the vehicle 100 could include other torque-generating sources, such as an electric motor powered by a battery system in a hybrid configuration of the vehicle 100. Air is drawn into the engine 104 via an induction system 108 and exhaust gas resulting from combustion is expelled from the engine 104 via an exhaust system 112. In one exemplary implementation, the exhaust system 112 includes a three-way catalytic converter (TWC) and a muffler. The drive torque generated by the engine 104 is transferred from a crankshaft (not shown) of the engine 104 to a drivetrain 116 (e.g., wheels) of the vehicle 100 via a transmission (not shown).

A turbocharger system 120 includes a turbocharger 124 that uses kinetic energy from the exhaust gas (e.g., exhaust gas back pressure or flow) in the exhaust system 112 to pressurize and thereby increase airflow into the engine 104 via the induction system 108. More particularly, the exhaust gas drives a turbine 128 (e.g., a twin scroll turbine) of the turbocharger 124, which in turn drives a compressor 132 (e.g., a centrifugal compressor) of the turbocharger 124 via a shaft 136. A controller 140 controls airflow into the engine 104 to achieve a desired amount of air, e.g., based on torque request provided by a driver. This includes the controller 140 coordinating control of the turbocharger system 120 along with other devices (e.g., a throttle, not shown) such that the desired amount of air enters the engine 104. In some implementations, the vehicle 100 includes an exhaust gas recirculation (EGR) system (not shown) that recirculates exhaust gas into the engine 104 in a coordinated manner.

Figure 2:
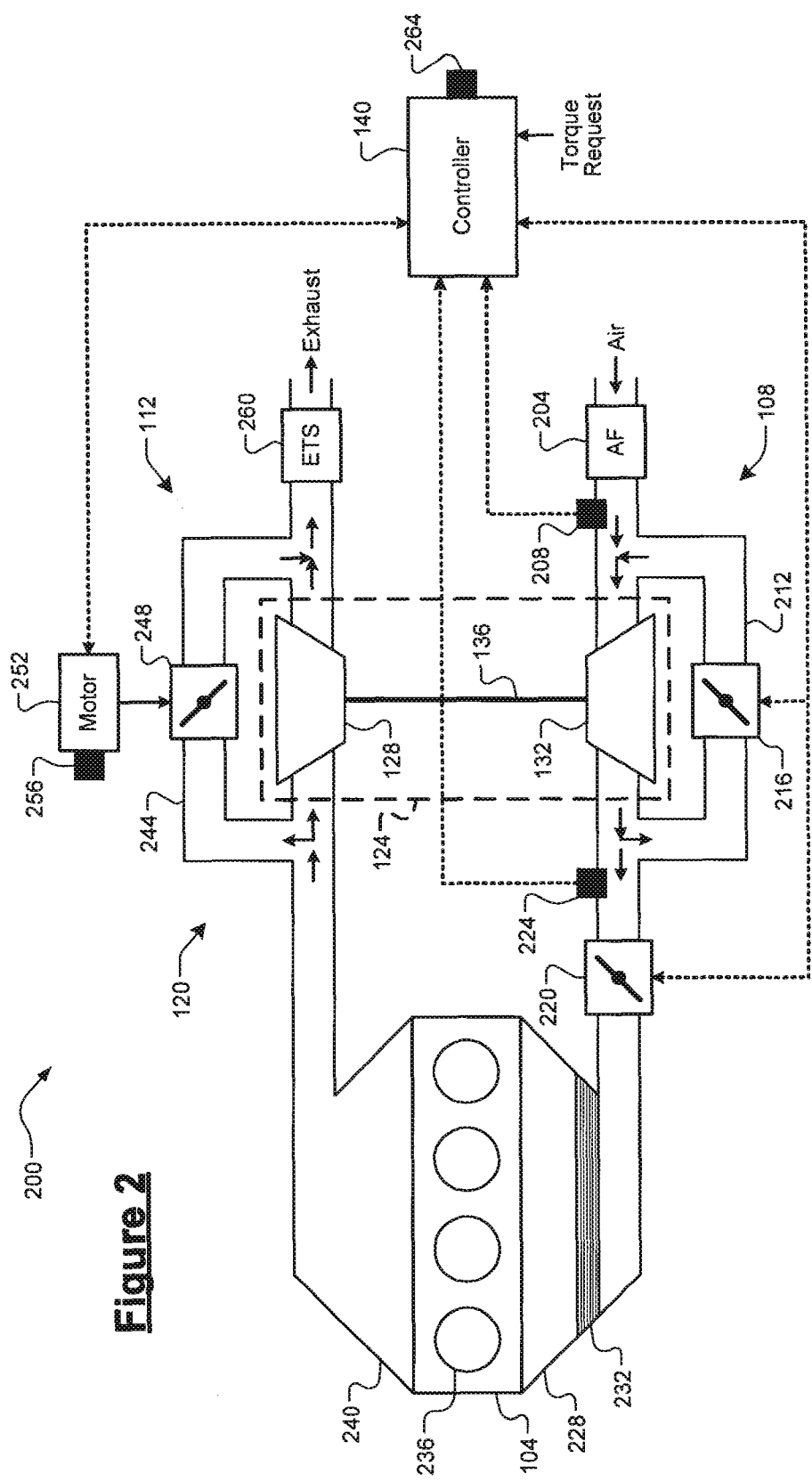
FIG. 2 is a schematic diagram of an example turbocharger system according to the principles of the present disclosure.

Referring now to FIG. 2, a schematic diagram of an example configuration 200 of the turbocharger system 120 is illustrated. Air is drawn into the induction system 108 by the compressor 132 through an air cleaner or air filter (AF) 204. An inlet temperature sensor 208 is configured to measure a temperature of the air at an inlet of the compressor 132. Pressurized air output by the compressor 132 is selectively recirculated via a compressor recirculation path 212 that is regulated by a compressor recirculation valve 216. The pressurized air is also selectively provided to an intake manifold 228 of the engine 104 via a throttle valve 220 (e.g., a butterfly valve). An inlet pressure sensor 224 is configured to measure an air pressure at an inlet of the throttle valve 220. An optional air cooler 232 is configured to cool the pressurized air provided to the intake manifold 228.

The pressurized air in the intake manifold 228 is distributed to a plurality of cylinders 236 and combined with fuel to create a pressurized air/fuel mixture. While only four cylinders are shown, it will be appreciated that the engine 104 could include any suitable number of cylinders. The fuel is injected into the engine 104 via fuel injectors (not shown) arranged in any suitable configuration (port fuel injection, direct fuel injection, etc.). The combustion of the pressurized air/fuel mixture within the cylinders 236 drives pistons (not shown), which rotatably turn the crankshaft (not shown) to generate drive torque. Pressurized exhaust gas resulting from combustion is expelled from the cylinders 236 into an exhaust manifold 240. Before being treated and released into the atmosphere, kinetic energy of the pressurized exhaust gas is utilized by the turbocharger system 120. More particularly, the pressure/flow of the pressurized exhaust gas causes the turbine 128 to rotate, which in turn drives the compressor 132 via the shaft 136.

The pressurized exhaust gas selectively bypasses the turbine 128 via a turbine bypass path 244 that is regulated by a wastegate valve 248. The wastegate valve 248 is actuated by a wastegate actuator 252. In one exemplary implementation, the wastegate actuator 252 comprises a direct current to direct current (DC-DC) electric motor that is driven (e.g., via an electric current) to position the wastegate valve 248 at a desired position and a position sensor 256 configured to measure a position of the wastegate valve 248. The wastegate valve 248 is configured to control an amount of the pressurized exhaust gas that is driving the turbine 128, which is also known as a level of "boost" Exhaust gas output by or bypassing the turbine 128 is then treated by an exhaust treatment system (ETS) 260 before being released into the atmosphere. In one exemplary implementation, the ETS 260 includes a three-way catalytic converter (TWC) and a muffler, but it will be appreciated that other suitable configurations could be implemented for the ETS 260.

As previously mentioned, the disclosed techniques directly link a target power for the compressor 132 to a target position for the wastegate valve 248. This eliminates many complex intermediate mathematical operations and dramatically simplifies the calibration process. Examples of these intermediate operations include calculating a target turbine pressure ratio (i.e., inlet vs. outlet pressures) and target turbine and wastegate mass flow rates. The following description will provide the derivation and assumptions for proving this direct link between target compressor power and target wastegate valve position. To begin, the engine torque request is used in calculating a target engine airflow rate ($m_{Air}^{Tgt}$) and a target throttle inlet pressure ($P_{ThrIn}^{Tgt}$).

Thus, a target compressor power ($Pow_{Comp}^{Tgt}$) is calculated as follows:

$$Pow_{Comp}^{Tgt} = \quad (1)$$

$$\frac{m_{Air}^{Tgt} Cp_{Air} T_{CompIn}}{\eta_C \left( \frac{m_{Air}^{Tgt} \sqrt{T_{CompIn}/T_{CompRef}}}{P_{CompIn}/P_{CompRef}}, \frac{P_{ThrIn}^{Tgt}}{P_{CompIn}} \right)} \left[ \left( \frac{P_{ThrIn}^{Tgt}}{P_{CompIn}} \right)^{\frac{\gamma_{Air}-1}{\gamma_{Air}}} - 1 \right],$$

where $Cp_{Air}$ and $\gamma_{Air}$ are a specific heat at constant pressure of intake air and a specific heat ratio of intake air, respectively; $T_{compin}$ is compressor inlet temperature, measured by the inlet temperature sensor 208; $P_{Compin}$ is compressor inlet pressure, which is calculated as a barometric pressure ($P_{Baro}$, measured by a barometric pressure sensor 264 within or associated with the controller 140) minus a pressure loss across the air filter 204 (predetermined or modeled/estimated); $\eta_C$ is a compressor isentropic efficiency map based on compressor corrected mass flow rate and pressure ratio; and $P_{compRef}$ and $T_{compRef}$ are reference compressor inlet pressure and temperature, respectively.

Theoretically, there is a power loss via the shaft 136. Power balancing of the turbocharger 124, therefore, is describable as compressor power equals turbine power minus shaft loss plus inertial power. This, turbine power already takes into account shaft loss. The inertial power has a non-zero value during transient conditions (e.g., shaft acceleration/deceleration). One possible assumption, however, is that in a quasi-steady state, the inertial power is zero. Thus, based on this assumption, target compressor power equals the target turbine power. Accordingly, based on turbine characteristics, the target turbine pressure ratio ($Pr_{Tb}^{Tgt}$) has a relationship ($f_1$) with the target turbine power ($Pow_{Comp}^{Tgt}$) based on a table calibration as follows:

$$Pr_{Tb}^{Tgt} = f_1 \left( \frac{Pow_{Comp}^{Tgt}}{P_{TbOut} Cp_{Exh} \sqrt{T_{TbIn}}} \right), \quad (2)$$

where $Cp_{Exh}$ is a specific heat at constant pressure of the exhaust gas; $P_{TbOut}$ is turbine outlet pressure, which is calculated based on barometric pressure $P_{Baro}$ plus a pressure loss across the ETS 260 (predetermined or modeled/estimated); and $T_{TbIn}$ is turbine inlet temperature (i.e., exhaust temperature), which is determined through an engine load/engine speed calibration mapping process. The term $P_{TbOut} Cp_{Exh} \sqrt{T_{TbIn}}$ is considered a turbine boundary condition to normalize turbine power. Through this normalization, a much simpler, single variable function (Equation 2) is derived to relate turbine pressure ratio and power to indicate turbine performance characteristics, which is easy for turbine modeling, calibration, and control method development as discussed below.

Figure 3A:
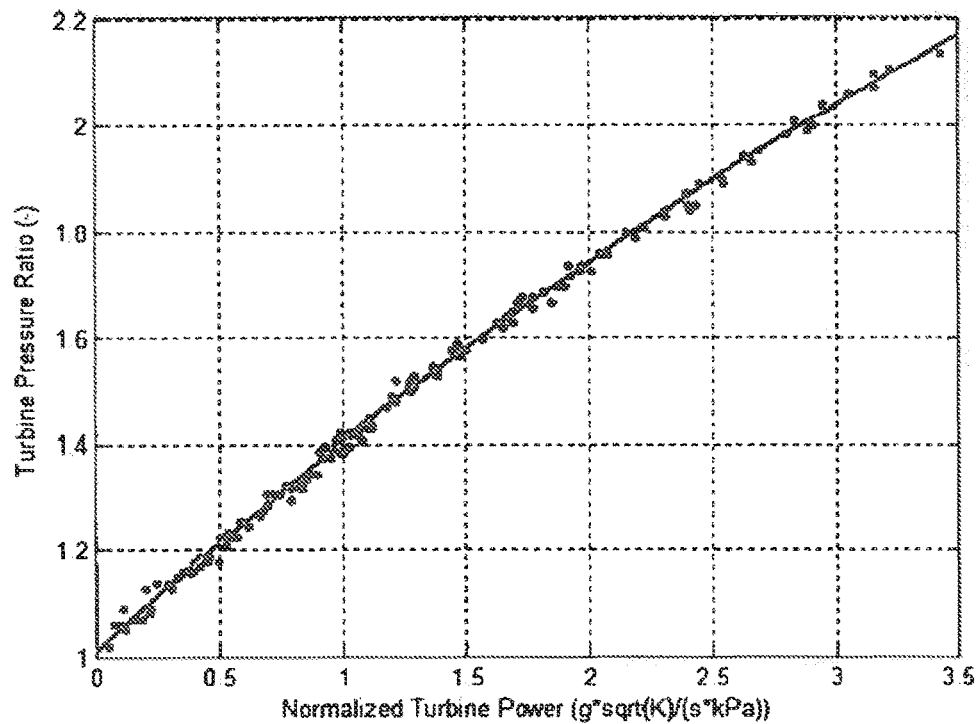
FIGS. 3A-3B are graphs illustrating example turbocharger data according to the principles of the present disclosure.
Figure 3B:
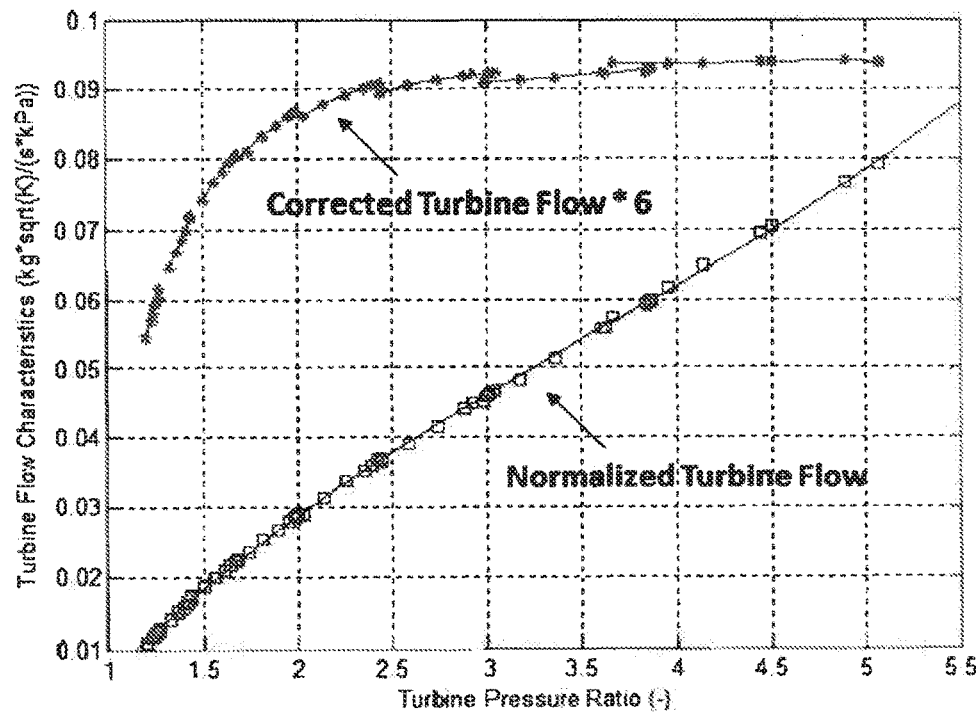

Referring now to FIG. 3A, the calibration expressed by Equation (2) based on data collected through dynamometer testing is illustrated. As shown, turbine pressure ratio (y-axis) is plotted as a function of normalized turbine power (x-axis). Referring now to FIG. 3B, turbine flow characteristics are illustrated. A turbocharger manufacturer could supply data, such as the compressor isentropic efficiency map $\eta_C$ and the reference compressor inlet temperature and pressure are at which the turbocharger manufacturer measures compressor data. The supplied data also regards corrected turbine flow as a function of both turbine pressure ratio and corrected turbocharger speed. Normalization is performed through multiplying corrected turbine flow with the turbine pressure ratio to get a normalized turbine flow, which is a polynomial function of the turbine pressure ratio, only to then remove the dependence of the turbine flow characteristics on the turbocharger speed term.

Referring again to FIG. 2 and with continued reference to FIG. 3B, based on the illustrated relationship, the target normalized turbine flow ($m_{Tb}^{Tgt}$) is calibratable as a function ($f_2$) of the target turbine pressure ratio ($Pr_{Tb}^{Tgt}$) as follows:

$$\frac{m_{Tb}^{Tgt} \sqrt{T_{TbIn}}}{P_{TbOut}} = f_2(Pr_{Tb}^{Tgt}), \quad (3)$$

where $\sqrt{T_{TbIn}}/P_{TbOut}$ is an exhaust flow boundary condition to normalize exhaust flows. As discussed above, a turbine flow tem (corrected flow) supplied by turbocharger manufacturers is a function of multiple factors: turbine pressure ratio and corrected speed. The normalized turbine flow, therefore, could be expressed as a function of pressure ratio, which simplifies the relationships between turbine characteristics. By assuming that compressible flow through the wastegate valve 248 analyzes wastegate flow characteristics, the target normalized wastegate flow is obtainable by a function ($f_3$) through manipulation of the compressible flow equation as follows;

$$\frac{m_{WG}^{Tgt} \sqrt{T_{TbIn}}}{P_{TbOut}} = f_3(\theta_{\Delta WG}^{Tgt}, Pr_{Tb}^{Tgt}), \quad (4)$$

where $m_{WG}^{Tgt}$ is the target normalized wastegate flow; and $\theta_{\Delta WG}^{Tgt}$ is a target wastegate valve opening position from fully-closed end stop, which is used to position the wastegate valve 248.

Considering the mass flow rate balance through the turbine 128 and the wastegate valve 248, the following relationship is obtainable:

$$\frac{m_{Exh} \sqrt{T_{TbIn}}}{P_{TbOut}} = \frac{m_{Tb}^{Tgt} \sqrt{T_{TbIn}}}{P_{TbOut}} + \frac{m_{WG}^{Tgt} \sqrt{T_{TbIn}}}{P_{TbOut}}, \quad (5)$$

where $m_{Exh}$ is exhaust mass flow through both the turbine 128 and the wastegate valve 248, which is calculated based on an air/fuel ratio of the exhaust gas (e.g., from an oxygen sensor (not shown)) and a cylinder mass flow rate. By inserting Equations (2), (3), and (4) into Equation (5) above to replace the target normalized turbine and wastegate flows and the target turbine pressure ratio, the following relationship (g) is obtainable:

$$\frac{m_{Exh} \sqrt{T_{TbIn}}}{P_{TbOut}} = g \left( \theta_{\Delta WG}^{Tgt}, \frac{Pow_{Comp}^{Tgt}}{P_{TbOut} Cp_{Exh} \sqrt{T_{TbIn}}} \right). \quad (6)$$

By inverting the relationship of Equation (6), a function (h) the target wastegate valve opening position from fully-closed end stop is obtainable:

$$\theta_{\Delta WG}^{Tgt} = h \left( \frac{m_{Exh} \sqrt{T_{TbIn}}}{P_{TbOut}}, \frac{Pow_{Comp}^{Tgt}}{P_{TbOut} Cp_{Exh} \sqrt{T_{TbIn}}} \right). \quad (7)$$

This relationship is easily representable via a calibration table, which could be obtained from data obtained during dynamometer testing. More specifically, by inverting Equation (6), the target wastegate valve opening position from fully-closed end stop is directly calculated based on normalized exhaust flow and target normalized turbine power. Intermediate variables discussed herein (target turbine pressure ration, target turbine/wastegate valve mass flow rates, etc.), which are required to be calculated by conventional model-based techniques, no longer need to be calculated. This could significantly reduce costs and time in the development phase.

Because the disclosed techniques are in an open-loop manner, in one exemplary implementation, a closed-loop target wastegate valve opening position term (or "correction term") could be utilized. A proportional-integral-derivative (PID) control strategy could be utilized to add the correction term to minimize an error between target and current (actual) throttle inlet pressure. As previously described, the actual throttle inlet pressure is measured by inlet pressure sensor 224. To compensate for hardware variations and component aging, in one exemplary implementation, an adaptation scheme could also be utilized. This adaptation includes learning the target wastegate valve opening position due to boost pressure error and storing it in adaptation cells (e.g., at a memory (not shown) of the controller 140). The adaptation process should be slow and enabled only in certain stable (e.g., non-transient) conditions. The sum of the open-loop, closed-loop, and adaptation terms could then be sent to the wastegate actuator 252 for closed-loop position control using the sensor 256.

Figure 4:
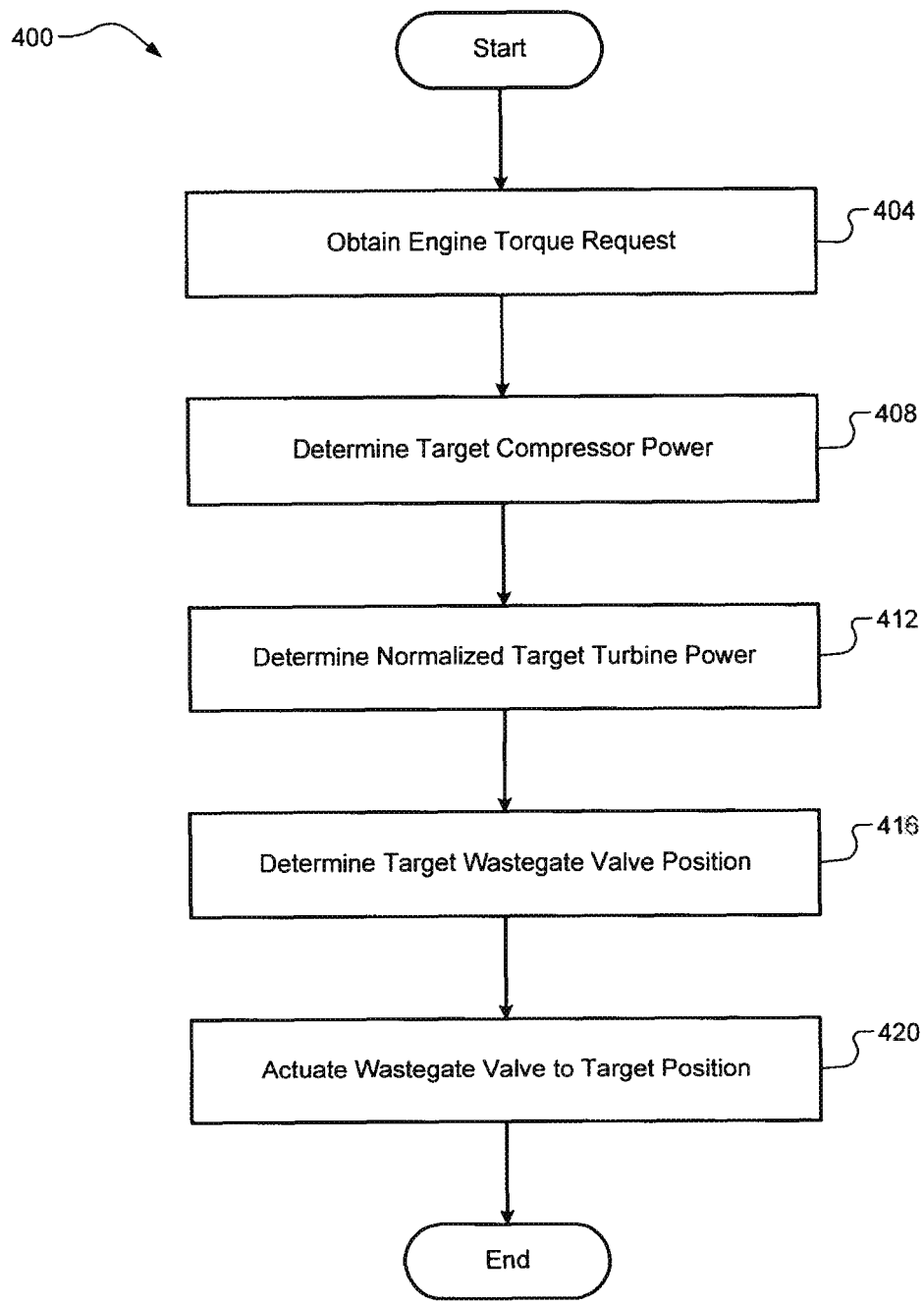
FIG. 4 is a flow diagram of an example method of controlling a turbocharger of an engine according to the principles of the present disclosure.

Referring now to FIG. 4, a flow diagram of an example method 400 for controlling a vehicle turbocharger. In one exemplary implementation, the method 400 is implemented and performed by the controller 140, but it will be appreciated that another suitable control device or multiple controllers/control devices could collectively implement and perform the method 400. At 404, the controller 140 obtains a torque request for the engine 104. At 408, the controller 140 determines a target compressor power based on the engine torque request. At 412, the controller 140 determines a normalized target turbine power based on the target compressor power. At 416, the controller 140 determines a target position for the wastegate valve 248 based on the normalized target turbine power and a normalized exhaust flow. At 420, the controller 140 actuates the wastegate valve 248 (e.g., using actuator 252) to the target position. The actuation of the wastegate valve 248 by the controller 140 (i) decreases at least one of boost reservation and throttling losses to (ii) increase at least one of engine response, performance, and fuel economy. The method 400 then ends or returns to 404 for one or more additional cycles.

As previously discussed, it will be appreciated that the term "controller" as used herein refers to any suitable control unit configured to perform at least a portion of the techniques of the present disclosure. Examples include an ASIC, one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system comprising:
   an engine having a turbocharger;
   a wastegate valve diverting exhaust gas from a turbine of the turbocharger, the turbine being rotatably coupled to a compressor of the turbocharger;
   a barometric pressure sensor configured to measure a barometric pressure;
   a compressor inlet temperature sensor configured to measure an air temperature at an inlet of the compressor;
   a throttle inlet pressure sensor configured to measure an actual throttle inlet pressure at an inlet of a throttle downstream from the compressor; and
   a controller storing non-transitory executable instructions that when executed cause the controller to:
      obtain a torque request for the engine provided by a driver;
      determine a target compressor power based on the engine torque request, the barometric pressure, and the air temperature at the compressor inlet;
      determine a normalized target turbine power based on the target compressor power;
      determine a target position for the wastegate valve directly based on the normalized target turbine power and a normalized exhaust flow; and
      actuate the wastegate valve to the target position,
   wherein, while the wastegate valve is actuated by the controller to the target position and adjusted based on the actual throttle inlet pressure, (i) at least one of boost reservation and throttling losses is decreased and (ii) simultaneously at least one of engine response, engine performance, and fuel economy is increased.

2. The system of claim 1, wherein the execution of the instructions further causes the controller to:
   based on the engine torque request, determine a target engine airflow and a target pressure at the inlet of the throttle; and
   determine the target compressor power based on specific heat coefficients, the air temperature and a pressure at the inlet of the compressor, and an efficiency of the compressor.

3. The system of claim 2, wherein the execution of the instructions further causes the controller to determine the normalized target turbine power based further on a specific heat coefficient, exhaust pressure at an outlet of the turbine, and exhaust temperature at an inlet of the turbine.

4. The system of claim 3, wherein the execution of the instructions further causes the controller to:
   determine the air pressure at the compressor inlet as a difference between the barometric pressure and a pressure drop across an air filter upstream from the compressor; and
   determine the exhaust pressure at the outlet of the turbine as a sum of the barometric pressure and a pressure drop across an exhaust treatment system downstream from the wastegate valve.

5. The system of claim 4, wherein the turbine is a twin scroll turbine disposed upstream from the exhaust treatment system, and wherein the exhaust treatment system comprises a three-way catalytic converter and a muffler.

6. The system of claim 4, wherein the execution of the instructions further causes the controller to:

determine a closed-loop correction value for the target position for the wastegate valve based on an error between the target throttle inlet pressure and the actual throttle inlet pressure; and actuate the wastegate valve to a corrected target position that is based on the target position and the closed-loop correction value.

7. The system of claim 6,
wherein the execution of the instructions further causes the controller to determine the turbine inlet exhaust temperature based on engine speed and engine load.

8. The system of claim 6, wherein the controller is configured to implement a proportional-integral-derivative (PID) control scheme to determine the closed-loop correction value.

9. The system of claim 1, further comprising:
a wastegate valve actuator comprising an electric direct current to direct current (DC-DC) motor configured to actuate the wastegate valve; and
a wastegate valve position sensor configured to measure a position of the wastegate valve actuator,
wherein the execution of the instructions further cases the controller to determine a position of the wastegate valve based on the position of the DC-DC electric motor.

10. The system of claim 1, wherein in the controller, the target wastegate valve position directly based on the normalized target turbine power and a normalized exhaust flow is calculated by a following equation:

$$\theta_{\Delta WG}^{Tgt} = h\left(\frac{m_{Exh}\sqrt{T_{TbIn}}}{P_{TbOut}}, \frac{Pow_{Comp}^{Tgt}}{P_{TbOut}Cp_{Exh}\sqrt{T_{TbIn}}}\right),$$

where $\theta_{\Delta WG}^{Tgt}$ is the target wastegate valve position and h is a function relating various wastegate valve positions to
(i) exhaust gas mass flow through both the turbine and the wastegate valve ($m_{Exh}$),
(ii) an exhaust flow boundary condition to normalize exhaust flow ($\sqrt{T_{TbIn}}/P_{TbOut}$) comprising exhaust temperature at a turbine inlet ($T_{TbIn}$) and exhaust pressure at a turbine outlet ($P_{TbOut}$),
(iii) the target compressor power ($Pow_{Comp}^{Tgt}$), and
(iv) a turbine boundary condition to normalize turbine power ($P_{TbOut}Cp_{Exh}\sqrt{T_{TbIn}}$) comprising the exhaust pressure at the turbine outlet pressure, the exhaust temperature at the turbine inlet, and a specific heat at constant pressure of the exhaust gas ($Cp_{Exh}$) and the exhaust temperature at the turbine inlet ($T_{TbIn}$).

11. A method for controlling a turbocharger of an engine, the turbocharger comprising a turbine and a compressor rotatably coupled, the engine further comprising a wastegate valve diverting exhaust gas from the turbine, a barometric pressure sensor, a compressor inlet temperature sensor, a throttle inlet pressure sensor, and a controller, the method comprising:
obtaining, by the controller, a torque request for the engine provided by a driver;
determining, by the controller, a target compressor power based on the engine torque request, a barometric pressure measured by the barometric pressure sensor, and an air temperature at an inlet of the compressor measured by the compressor inlet temperature sensor;

determining, by the controller, a normalized target turbine power based on the target compressor power;
determining, by the controller, a target position for the wastegate valve directly based on the normalized target turbine power and a normalized exhaust flow; and
actuating, by the controller, a wastegate valve to the target position, the wastegate valve being configured to divert exhaust gas from the turbine,
wherein, while the wastegate valve is actuated by the controller and adjusted based on an actual throttle inlet pressure measured by the throttle inlet pressure sensor (i) at least one of boost reservation and throttling losses is decreased and (ii) simultaneously at least one of engine response, engine performance, and fuel economy is increased.

12. The method of claim 11, further comprising:
based on the engine torque request, determining, by the controller, a target engine airflow and a target pressure at an inlet of a throttle downstream from the compressor; and
determining, by the controller, the target compressor power based on specific heat coefficients, air temperature and pressure at the inlet of the compressor, and an efficiency of the compressor.

13. The method of claim 12, wherein determining the normalized target turbine power is based further on a specific heat coefficient, exhaust pressure at an outlet of the turbine, and exhaust temperature at an inlet of the turbine.

14. The method of claim 13, further comprising:
receiving, by the controller and from the barometric pressure sensor, the barometric pressure;
determining, by the controller, the air pressure at the compressor inlet as a difference between the barometric pressure and a pressure drop across an air filter upstream from the compressor; and
determining, by the controller, the exhaust pressure at the outlet of the turbine as a sum of the barometric pressure and a pressure drop across an exhaust treatment system downstream from the wastegate valve.

15. The method of claim 14, wherein the turbine is a twin scroll turbine disposed upstream from the exhaust treatment system, and wherein the exhaust treatment system comprises a three-way catalytic converter and a muffler.

16. The method of claim 14, further comprising:
determining, by the controller, a closed-loop correction value for the target position for the wastegate valve based on an error between the target throttle inlet pressure and the actual throttle inlet pressure; and
actuating, by the controller, the wastegate valve to a corrected target position that is based on the target position and the correction value.

17. The method of claim 16, further comprising:
determining, by the controller, the turbine inlet exhaust temperature based on engine speed and engine load.

18. The method of claim 16, wherein determining the closed-loop correction term includes implementing a proportional-integral-derivative (PID) control scheme.

19. The method of claim 11, further comprising determining, by the controller, a position of the wastegate valve based on the position of a wastegate valve actuator measured by a wastegate valve position sensor, the wastegate valve actuator comprising an electric direct current to direct current (DC-DC) motor.

20. The method of claim 11, calculating the target wastegate valve position directly based on the normalized target turbine power and a normalized exhaust flow is performed by the controller using a following equation:

$$\theta_{\Delta WG}^{Tgt} = h\left(\frac{m_{Exh}\sqrt{T_{Tbin}}}{P_{TbOut}}, \frac{Pow_{Comp}^{Tgt}}{P_{TbOut}C_{PExh}\sqrt{T_{Tbin}}}\right),$$

where $\theta_{\Delta WG}^{Tgt}$ is the target wastegate valve position and h is a function relating various wastegate valve positions to
  (i) exhaust gas mass flow through both the turbine and the wastegate valve ($m_{Exh}$),
  (ii) an exhaust flow boundary condition to normalize exhaust flow ($\sqrt{T_{TbIn}}/P_{TbOut}$) comprising exhaust temperature at a turbine inlet ($T_{TbIn}$) exhaust pressure at a turbine outlet ($P_{TbOut}$),
  (iii) the target compressor power ($Pow_{Comp}^{Tgt}$), and
  (iv) a turbine boundary condition to normalize turbine power ($P_{TbOut}Cp_{Exh}\sqrt{T_{TbIn}}$) comprising exhaust pressure at the turbine outlet pressure, the exhaust temperature at the turbine inlet, and a specific heat at constant pressure of the exhaust gas ($Cp_{Exh}$) and the exhaust temperature at the turbine inlet ($T_{TbIn}$).

* * * * *